May 5, 1931.  G. A. WITTE  1,803,821
METHOD OF GRINDING MATERIAL
Filed June 8, 1927
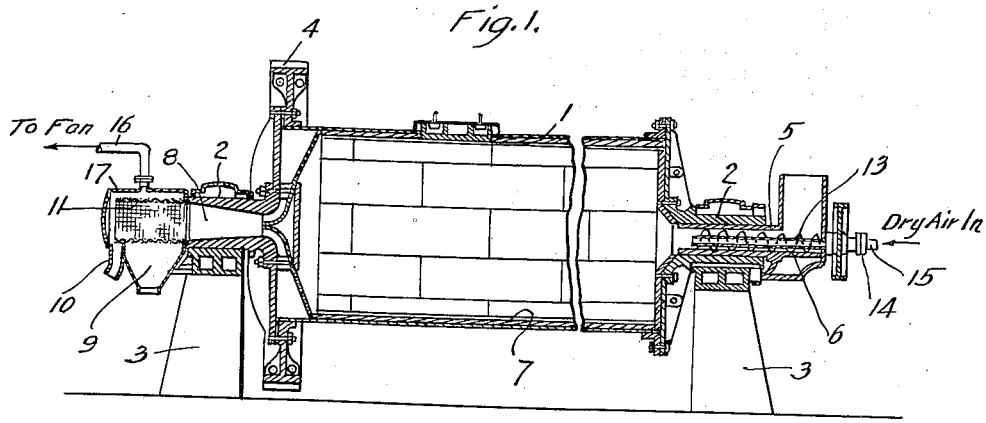
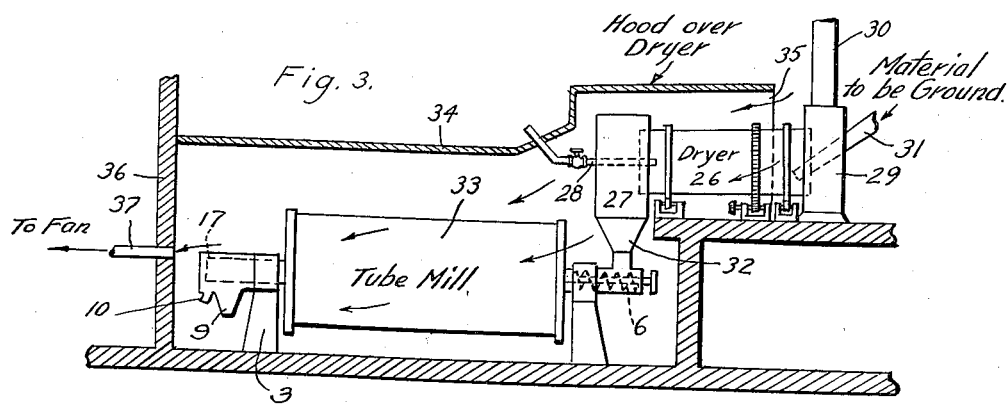
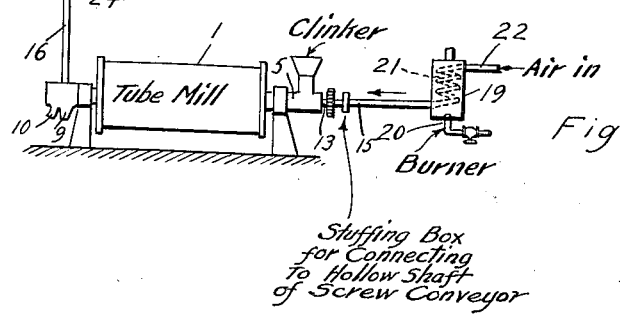
INVENTOR.
Gustav A. Witte,
BY Arthur P. Knight and
Alfred W. Knight
ATTORNEYS.

Patented May 5, 1931

1,803,821

UNITED STATES PATENT OFFICE

GUSTAV A. WITTE, OF RIVERSIDE, CALIFORNIA, ASSIGNOR TO INTERNATIONAL PRECIPITATION COMPANY, OF LOS ANGELES, CALIFORNIA, A CORPORATION OF CALIFORNIA

METHOD OF GRINDING MATERIAL

Application filed June 8, 1927. Serial No. 197,302.

This invention relates to a method for grinding Portland cement clinker, to a fine state of subdivision.

An important object of the invention is to facilitate the grinding operation and to reduce the time required for grinding a given quantity of material to a certain degree of fineness.

A further object of the invention is to prevent the deleterious effect upon Portland cement clinker or other cementitious materials of the presence of moisture or water vapor in the gaseous medium in which the grinding is conducted, by lowering the relative humidity of such gaseous medium. In the case of Portland cement clinker the deleterious effect of grinding in air or other gas having a high relative humidity consists principally in the production of a cement having too quick a setting time to permit satisfactory use thereof.

In grinding Portland cement clinker to a fine state of subdivision to produce finished cement, and particularly in grinding such material to the fineness required for the production of a cement having high early strength, I have found that the presence of moisture or of a high relative humidity retards the rate of grinding. For example, when grinding cement to a fineness of 95% minus 200 mesh, variations in the relative humidity of the atmosphere have such an effect that the grind obtainable in 24 hours under conditions of high relative humidity, can be accomplished in two to three hours on a dry day. An additional effect which I have noticed is that such cement finely ground on a damp day has a very quick set, or I might say a "flash set", whereas cement finely ground on a dry day has a much slower or normal setting time.

My improved process of grinding consists in maintaining the relative humidity of the gaseous medium in which the grinding operation is conducted sufficiently low to produce the desired results, and particularly to facilitate the grinding and permit the cement material to be ground to the desired fineness while maintaining substantially the normal setting time thereof. Since the relative humidity of such gaseous medium is dependent upon the temperature thereof, the process also includes the regulation or control of the temperature of the material being ground, and of the air or other gaseous medium surrounding the same, so as to cause said gaseous medium to be at all times at a temperature materially above its dew point.

The grinding operation may be carried out, for example, in an apparatus consisting in a tube mill or other grinding device, and means for maintaining a gaseous medium of low relative humidity within said grinding device. The means for this purpose may for example comprise means for continually or intermittently introducing a gas of low relative humidity into the grinding chamber of said device, and means may also be provided for maintaining the temperature of the material being ground sufficiently high to prevent reduction of the temperature of such gaseous medium below the dew point thereof. As one specific means of maintaining low relative humidity in the gas introduced into said grinding chamber, such gas may be heated before passing into said chamber so as to suitably reduce the relative humidity thereof, and the temperature of the material being ground may be controlled by heating such material in any suitable manner before the same enters the grinding chamber or while in said chamber. Such heating of the material to be ground is not only for the purpose of thoroughly drying the same but also for preventing cooling of the gaseous medium below its dew point by contact with such material.

As an example of the effects of humidity in the atmosphere both upon the rate of grinding and upon the setting time of Portland cement, the following table is presented. The material used in each case consisted of an equal amount of a certain clinker plug 3% gypsum, and the same ball charge was used in the tube mill in each case.

|  | Ground in dry atmosphere | Ground in humid atmosphere | |
| --- | --- | --- | --- |
|  | No. 1 | No. 2 | No. 3 |
| Time of grinding | 2hrs.35min. | 2hrs.30min. | 19hrs.40min. |
| Fineness (per cent minus 200 mesh) | 95% | 91% | 95% |
| Setting (initial) | 1 hr. 50min. | 10 min. | 11 min. |
| Time (final) | 5hrs.39min. | 2hrs.48min. | 1 hr. 3 min. |

It will be seen from the above table that with substantially equal times of grinding a fineness of only 91% was obtained in a humid atmosphere as against a fineness of 95% in a dry atmosphere, and that the setting time of the material ground even to this lower degree of fineness in a humid atmosphere was seriously reduced, in fact beyond the point of compliance with commercial specifications. It will also be seen that in order to obtain the same degree of fineness, it was necessary to grind over seven times as long in a humid atmosphere as in a dry atmosphere, and that this longer period of time still further reduced the final setting time of the cement.

The accompanying drawings illustrate apparatus which is suitable for carrying out the grinding operation in the manner above described. Referring to said drawings:

Fig. 1 is a vertical section of a tube mill provided with means for inflow and outflow of air or other gas of low relative humidity therethrough.

Fig. 2 is a side elevation of apparatus including a tube mill such as shown in Fig. 1 and means for heating the gas going to the tube mill so as to lower the relative humidity thereof.

Fig. 3 is a side elevation of another form of apparatus, including means for drying the material before feeding into the tube mill.

The tube mill shown in Fig. 1 comprises the usual cylindrical shell 1 rotatably mounted as by trunnions 2 passing through suitable bearing means on supports 3, and provided with suitable means for rotation thereof, such as ring gear 4.

A feed passage 5 extends through one of the trunnions and suitable means such as screw conveyor 6 are provided for conveying the material to be ground through such passage and into the grinding chamber 7. A discharge passage 8 extends through the other trunnion and communicates with discharge spouts 9 and 10 for the ground material. A screen or perforated member 11 of suitable mesh may be provided for permitting only the finer material to enter the discharge spout 9, any coarse material being discharged separately through spout 10. The mill as so far described is similar to several well known types of tube mills now in use, and the specific construction thereof forms no part of my invention.

In order to maintain inflow and outflow of air or other gas through such a tube mill, the screw conveyor 6 may be provided with a hollow shaft 13 connected through suitable stuffing box 14 to inlet pipe 15, while outlet pipe 16 may be connected to the housing 17 at the discharge end of the mill, said outlet pipe leading to a fan or other means for causing gas to be drawn outwardly therethrough.

Any suitable means may be employed for lowering the relative humidity of the air or gas to be introduced into the tube mill. For example such gas may be passed over any suitable drying agent such as quick lime so as to remove a portion of the water vapor therefrom. For practical purposes, however, I prefer to simply heat or warm the air or gas before entering the tube mill. For this purpose a small heater 19 may be provided, as shown in Fig. 2, including burner means 20 and a heating coil 21 in position to be heated by the flame from said burner. Air or other gas may be introduced or drawn in through pipe 22 to said heating coil, which is in turn connected to inlet pipe such as 15 to the above described means for introducing the same into the tube mill. A fan 24 is also shown in the outlet pipe 16, said fan being of relatively small size so as to cause only a slow flow of gas through the tube mill. It will of course be understood that where a plurality of tube mills are in operation, a single heater and a single fan may be connected to all of said mills.

In carrying out the grinding operation in the apparatus above described, it will be understood that the usual charge of balls or other grinding media is placed within the grinding chamber 7. The Portland cement clinker to be ground is then continually fed in by means of screw conveyor 6 and the ground material continually discharged through discharge spouts 9 and 10. A slow stream of air is drawn through the system by fan 24, such air being heated in passing through heating coil 21 so as to lower the relative humidity thereof, and then passing into the grinding chamber 7 so as to maintain an atmosphere of low relative humidity therein.

The clinker may be dried, and heated to a temperature above atmospheric temperature, in any suitable manner before entering the tube mill, for example by mixing therewith a certain proportion of hot clinker as discharged from the kilns. The mixing of the hot clinker with the rest of the clinker and the drying and heating thereof may be satisfactorily accomplished in the preliminary grinder which usually precedes the tube mill in the grinding of Portland cement clinker. By thus heating the material fed into the tube mill the gaseous medium may be prevented from cooling materially while in said tube mill and may therefore be maintained at a low relative humidity.

Another form of apparatus for carrying out my invention is shown in Fig. 3. In this case a rotary drier 26 is provided, having a housing 27 at its lower end through which projects burner means 28, and a housing 29 at its upper end communicating with stack 30. Suitable means 31 are provided for introducing the material to be ground into the drier 26, and means 32 may be provided for conducting the material from the drier to the feed opening of tube mill 33. Said tube mill may be of any well known construction, and may be provided with the usual means for feed and discharge of material. A hood or casing 34 may be provided, extending over the drier and tube mill, said casing being open at the end over the drier as at 35 and being closed at the other end as by wall 36. Pipe 37 may lead to a fan or other suitable means for causing air to be drawn through beneath hood 34 in the direction indicated by the arrows.

In the operation of this form of apparatus the Portland cement clinker to be ground passes first through the drier 26 wherein it is dried and heated to a temperature somewhat above atmospheric temperature and then passes through tube mill 33 in which it is reduced to the desired state of subdivision. The air drawn into hood 34 through opening 35 passes first around the drier 26 and is heated by contact with and radiation from said drier so as to lower the relative humidity thereof, and such air then passes directly around the tube mill, so that any air entering the tube mill by leakage, as in the usual grinding operation, is of low relative humidity.

It may be seen, therefore, that I may either provide means for positively introducing dry air into the interior of the grinding chamber of the mill, or may simply provide means for maintaining an atmosphere of such dry air around the mill so that any air which is drawn into the mill will be dry.

It will be understood that the above described method for maintaining a gaseous medium of low relative humidity around the material during grinding may not be necessary at all times. For example in warm or dry weather the grinding operation may be conducted in the usual manner, the method above described being practiced only when the natural humidity of the atmosphere becomes sufficiently high to retard the grinding operation or to deleteriously affect the properties of the ground material.

I claim:

1. The method of grinding Portland cement clinker to a fine state of division while maintaining the normal setting time of the finished cement, which comprises subjecting the same to a grinding operation in the presence of air, and maintaining such air at a relative humidity lower than that of the atmosphere.

2. The method set forth in claim 1, in which the relative humidity of the air is reduced below that of the atmosphere by heating such air to a temperature above atmospheric temperature.

3. The method set forth in claim 1, in which the relative humidity of the air is reduced below that of the atmosphere by heating such air to a temperature above atmospheric temperature, and in which the clinker being ground is also maintained at a temperature above atmospheric temperature.

4. The method of grinding Portland cement clinker to a fine state of division while preventing deleterious effects upon the setting properties of the ground cement which comprises subjecting the same to a grinding operation in an enclosed chamber, and introducing air of low relative humidity into such enclosed chamber during the grinding operation.

5. The method set forth in claim 4, in which the air is heated before introduction into said enclosed chamber so as to lower the relative humidity thereof.

6. The method set forth in claim 4, in which the air is heated before introduction into said enclosed chamber so as to lower the relative humidity thereof, and in which the clinker to be ground is also heated before introduction into said enclosed chamber so as to prevent the air from being cooled below the dew point thereof during the grinding operation.

7. The method of preventing deleterious action of atmospheric moisture upon Portland cement clinker during the grinding thereof, which comprises conducting the grinding of such clinker in a gaseous medium of lower relative humidity than the atmosphere.

In testimony whereof I have hereunto subscribed my name this 27th day of May, 1927.

GUSTAV A. WITTE.